Patented Nov. 22, 1938

2,137,927

UNITED STATES PATENT OFFICE 2,137,927

PROCESS FOR OBTAINING METAL COMPOUNDS OF WATER-SOLUBLE KERATIN SPLITTING PRODUCTS

Ernst Sturm and Richard Fleischmann, Berlin, Germany, assignors to Chemische Fabrik Johann A. Wulfing, Berlin, Germany No Drawing. Application January 28, 1936, Serial No. 61,256. In Germany February 16, 1935

17 Claims. (Cl. 260—113)

The present invention relates to the production of therapeutically active metal derivatives of keratin products.

It is known by German patents to convert chemo-therapeutically active metal salts with sulphur-rich sulphhydryl albumen splitting products. Thus, according to German Patent No. 551,871 gold is bound to sulphhydryl albumoses, and according to German Patent No. 578,828 zinc, bismuth, lead, mercury, silver, gold and copper, and according to German Patent No. 588,710 bismuth, arsenic and antimony, are bound to sulphhydryl keratinates or sulphhydryl keratinic acids. In German Patent No. 605,074 metal sulphhydryl compounds are also obtained, since in the interaction of keratinates and similar degradation products with arsenobenzenes condensation products of arsine oxides with sulphhydryl compounds are formed.

In contradistinction to these known processes, according to the present invention unreduced water-soluble keratin splitting products are always used. The process provided by the present invention for obtaining metal compounds from water-soluble keratin degradation products consists in subjecting keratin material to a non-reducing hydrolysis by treatment with acid to the point of partial dissolution at least, removing the acid hydrolyzing agent, reducing the hydrolysate to dryness, treating the residue in the presence of water with a soluble salt of one of the metals gold, silver, mercury, lead, bismuth, antimony, and isolating the metal keratin compound formed, sufficient metal salt being added for the resulting compound to contain metal to an extent equivalent to at least 5% of silver.

The production of the water-soluble keratin splitting products by hydrolysis of keratins with acids up to more or less complete solution is carried out in the known manner. The reduction of the hydrolysate to dryness is effected by evaporation of the solution in vacuum at low temperature, in the case of hydrolysis with sulphuric acid or phosphoric acid after previous neutralization with barium carbonate or hydroxide. The acid hydrolysate can also be dialyzed before evaporation, if necessary after previous neutralization with alkali. However, the products obtained by acid dialysis have proved to be particularly suitable. They are characterized by a high sulphur content which extends up to 7%.

In general the keratin splitting products are the more suitable for the production of the metal compounds the higher is their sulphur content. They are all water-soluble and react weakly acid (acid to litmus and neutral to Congo red).

If the solution of a gold salt is added to the aqueous solutions of the keratin splitting products then a bright product precipitates out which, however, at first usually goes into solution again on stirring. On further addition of gold salt a precipitation then occurs in greater or smaller amount which no longer goes into solution. If, however, the acid reaction mixture is neutralized with caustic soda, then the precipitate in all cases goes into solution again, usually already before the neutralization point. On stirring the solutions into an organic solvent the sodium salts of the gold compounds precipitate out. The sodium salts of the gold compounds obtained thus are brightly coloured products which readily dissolve in water with neutral reaction and are very stable.

If sulphur dioxide is conducted into the aqueous solution of the keratin splitting products up to the point of saturation before the addition of the inorganic gold salt, and gold salt, e. g. $AuCl_3$, only then added, with good stirring and in small portions, then a precipitation occurs which for the most part rapidly goes into solution again, and solutions are obtained which even on long standing separate out no, or only a little, metallic gold. This is surprising inasmuch as, generally speaking, metallic gold is separated out from all solutions containing gold in the presence of sulphur dioxide, on which fact, as is well known, an analytical test for gold is based. Up to now it was only known that the gold is not to be brought to the point of separation from organic gold sulphhydryl compounds by leading in sulphur dioxide. In the presence of sulphur dioxide generally the more gold is taken up by the keratin splitting products the greater their sulphur content.

The silver and mercury salts react with the aqueous solutions of the keratin splitting products just like the gold salts.

If the aqueous solution of the keratin splitting products is treated with a soluble silver salt or mercury salt, then a bright voluminous precipitation occurs, which on stirring at first goes into solution again. On further addition of metal salt the precipitate becomes a permanent one, however, and can be brought into solution again only by addition of caustic soda up to neutral or weakly alkaline reaction. From such solutions, which are fairly stable and separate out no, or only a very little, metal, products can be precipitated out by means of alcohol which are soluble in water with neutral reaction and somewhat bright colour and are extraordinarily stable. This discovery is surprising inasmuch as up to now sulphur-poor protein splitting products have always been used in the preparation of silver protein compounds as well as of other heavy metal compounds, and the sulphur content of the proteins has always been felt to be harmful in the production of silver compounds or other heavy metal compounds. The readily soluble and fairly bright products obtained are characterized in addition by a special insensitivity towards light. They yield in aqueous solution no precipitate with sodium chloride, on the contrary the solutions remain perfectly clear.

If the aqueous solution of the keratin splitting products is treated with a solution of lead acetate, then a precipitation takes place to only a very small extent. The precipitation can here be completed by addition of alcohol. If neutralization is effected before the addition of alcohol then solutions are obtained which, when stirring into alcohol, deposit the water-soluble sodium salts of the lead compounds.

If a water-soluble bismuth compound is added to the aqueous solutions of the keratin splitting products, such as for example bismuth ammonium citrate, then a precipitation of the bright bismuth compound is obtained directly, which can be completed by addition of acetic acid.

On the other hand, sodium antimonyl tartrate dissolves in the aqueous solution of the keratin splitting products without any separation, or with only a very trifling separation. Such solutions can be neutralized with alkali without the formation of a precipitate taking place, whilst an aqueous solution of sodium antimonyl tartrate cannot be neutralized with alkali without precipitation. If the neutralized solutions of the antimony keratin splitting products which are obtained are stirred into alcohol, then a product of great stability is obtained which is readily soluble in water.

By the method of the present invention metal compounds of water-soluble keratin splitting products are obtained containing at least 5% of silver or the equivalent quantity of other heavy metal. The new compounds exhibit chemo-therapeutic activity, and the gold compounds, which more particularly have been investigated in this respect, are, for recurrent or relapsing infection in white mice, per 20 gm. of animal already active in an average dose of $\frac{1}{2000}$ g. with a tolerant dose of $\frac{1}{10}$–$\frac{1}{20}$ g., so that the calculated therapeutic index is 1:100 to 1:200. Certain of the new gold compounds are even effective with doses up to $\frac{1}{4000}$ g., i. e. show an index of 1:400. Even in the case of streptococci infection of white mice with Aronson stock, which hitherto could scarcely be therapeutically influenced, some of the new gold compounds were found to exert a pronounced healing action, so that up to 100% of the infected mice are kept alive. Some of the new gold compounds also very satisfactorily influence pneumococci infection.

*Example 1.*—Ten grams of keratin hydrolysate which has been obtained by hydrolysis of hairs with 25% hydrochloric acid on the water bath until only a small residue remains undissolved, subsequent acid dialysis and evaporation of the resulting solution up to dryness, are dissolved in 50 cc. of water.

To the solution 3.6 g. of $AuCl_3$ dissolved in 18 ccm. of water are added little by little and with stirring. A precipitation appears, which at first goes into solution again on stirring. On further addition of $AuCl_3$, however, it does not disappear again. The mixture is now treated with caustic soda up to a weak alkaline reaction, as a result of which the precipitate already goes into solution before the neutralization point. It is filtered, stirred into the tenfold quantity of alcohol and the product precipitated out thereby filtered off at the pump, washed with alcohol and dried in vacuum. The resulting product dissolves in water with yellow colour and neutral reaction.

*Example 2.*—A solution of 1.7 gm. of $AuCl_3$ in 12 ccm. of water is added in portions and whilst stirring to a solution in 25 ccm. of water of 5 gm. of a keratin hydrolysate which has been obtained by the hydrolysis of hairs with 25% hydrochloric acid on to the water bath up to the point of complete dissolution, neutralization with caustic soda, dialysis and evaporation to dryness of the solution obtained. By addition of caustic soda up to the point of weakly alkaline reaction the precipitate formed is redissolved and the solution further treated as in Example 1. The product obtained is readily soluble in water with weak alkaline reaction.

*Example 3.*—Ten grams of keratin hydrolysate which has been obtained by hydrolysis with sulphuric acid up to the point of dissolution, neutralization with barium carbonate and evaporation of the resulting solution down to dryness, are dissolved in 50 ccm. of water and a solution of 4 gms. of $AuCl_3$ in 20 ccm. of water is added thereto in portions and whilst stirring. A yellow precipitate appears which at first goes into solution again, but after further addition of the gold salt a fine slimy precipitate remains which can be brought into solution again only by addition of caustic soda. Caustic soda is added up to a weakly alkaline reaction. The precipitate, however, has already dissolved again before the neutral point is reached. The solution is further treated as in Example 1. The product obtained is very soluble in water giving a solution with neutral reaction.

*Example 4.*—Into a solution of 5 gms. of keratin hydrolysate, which has been obtained by hydrolysis of wool with sulphuric acid not quite up to complete dissolution, neutralization with barium carbonate and evaporation of the resulting solution down to dryness, 1.7 gm. of $AuCl_3$ dissolved in 8.5 ccm. of water are stirred in in portions and the reaction mixture worked up as in the preceding example. The product is very readily soluble in water with neutral reaction.

*Example 5.*—Five grams of keratin hydrolysate, which has been obtained by hydrolysis with sulphuric acid, neutralization with caustic soda, followed by dialysis and evaporation of the resulting solution, are dissolved in 25 ccm. of water and to the solution 1.9 gm. of $AuCl_3$ in 12 cc. of water are added. The precipitation resulting hereby which at first cannot be brought into solution again, is dissolved by addition of caustic soda up to the point of weak alkaline reaction and the solution further treated as in Example 1. The product is readily soluble in water and reacts neutral.

*Example 6.*—Into a strongly acid reacting solution of 5 gms. of keratin hydrolysate hydrochloride, which has been obtained by hydrolysis of hairs with 25% hydrochloric acid on the water bath up to the point of not quite complete dissolution, decolourization with active charcoal and subsequent evaporation in vacuo at low temperature, dissolved in 25 cc. of water a solution of 0.7 gm. of $AuCl_3$ in 3.5 ccm. of water is stirred. Only after the gold chloride solution has been nearly completely added does a precipitate appear which rapidly disappears again. The turbid solution is immediately neutralized with caustic soda, filtered off from the very little separated gold and the now clear solution worked up as in the other examples. The bright product obtained dissolved readily in water with a yellow colour and neutral reaction.

*Example 7.*—Into the solution in 50 ccm. of water of 10 g. of keratin hydrolysate which has been obtained by hydrolysis of hairs with 25% hydrochloric acid on the water bath until only a small residue remains undissolved, acid dialysis and evaporation down to dryness of the solution obtained, sulphur dioxide is introduced up to the point of saturation. To this solution, a solution of 3.4 gms. of $AuCl_3$ in 17 ccm. of water is cautiously added in small portions whereby a yellowish precipitate is formed which for the most part re-enters solution on stirring. The solution is left standing over night, whereby only a very trifling gold separation occurs. The bright brown coloured solution is filtered and neutralized with caustic soda whilst being well cooled. The weakly alkaline reacting solution is stirred into alcohol, whereby a yellowish product precipitates out which is filtered off at the pump, washed with alcohol and dried in vacuum. It is very readily soluble in water with a bright colour and weakly alkaline reaction.

*Example 8.*—Five grams of keratin hydrolysate, prepared by hydrolysis of hairs with 25% hydrochloric acid on the water bath up to incomplete dissolution and acid dialysis, are dissolved in 25 ccm. of water and a solution of 1 gm. of silver nitrate in 5 ccm. of water is added thereto in portions and whilst stirring. A white precipitate appears which at first goes up into solution again. On further addition of the silver nitrate solution, however, it remains undissolved as a fine slimy deposit which goes up into solution again on addition of caustic soda up to weakly alkaline reaction. The solution is filtered and stirred into the multifold quantity of alcohol, whereby the silver compound precipitates out as a bright product which is washed with alcohol and dried in vacuum. The very stable product is very readily soluble in water with a bright colour and neutral reaction. An aqueous solution of the compound yields no precipitate with common salt.

*Example 9.*—Five grams of keratin hydrolysate, which have been obtained by hydrolysis of hairs with 20% hydrochloric acid on the water bath up to the point of complete dissolution, neutralization with caustic soda, dialysis and evaporation of the resulting solution to dryness, are dissolved in 25 ccm. of water and 1 gm. of lead acetate in 5 ccm. of water is added thereto. At first a precipitate appears which, however, dissolves again, and at the end of the reaction there is only a very trifling precipitate present. The precipitation is completed by addition of alcohol whereby it settles as a solid bright product which is filtered off at the pump, washed with alcohol and dried in a vacuum.

However, the acid reaction mixture can also be neutralized with caustic soda and the resulting weakly alkaline reacting solution immediately stirred into the multifold quantity of alcohol, whereby the sodium salt of the lead compound is obtained as a bright brown product. It is soluble in water with weakly alkaline reaction.

*Example 10.*—Ten grams of keratin hydrolysate, prepared by hydrolysis of hair with 25% hydrochloric acid on the water bath up to not quite complete dissolution and acid dialysis, are dissolved in 50 ccm. of water and into the solution a solution of 5 gms. of bismuth ammonium citrate in 20 ccm. of water are introduced. A permanent bright precipitation occurs directly, which gradually settles. The precipitation is completed by addition of 2 to 4 ccm. of acetic acid and dilution with water, and the precipitate filtered off at the pump after some time, washed with water and dried in vacuum. The product obtained is insoluble in water, but on the other hand is readily soluble in dilute ammonia and in dilute caustic soda.

*Example 11.*—Five grams of keratin hydrolysate, which have been obtained by hydrolysis of hairs with 25% hydrochloric acid on the water bath just up to solution, neutralization with caustic soda, dialysis and evaporation of the solution obtained, are dissolved in 50 ccm. of water and 2 gm. of sodium antimonyl tartrate are added thereto. The antimonyl tartrate goes up into solution with separation of a trifling amount of brown precipitate. The solution is filtered, neutralized with NaOH, whereby no precipitation occurs, and the clear neutral, or weakly alkaline, reacting solution is stirred into the multifold quantity of alcohol. The solid bright product hereby precipitated out is filtered off at the pump, washed with alcohol and dried in a vacuum. The yellowish product is readily soluble in water and very stable.

What we claim is:—

1. A process for obtaining metal compounds from water-soluble keratin degradation products consisting in subjecting keratin material to a non-reducing hydrolysis by treatment with acid to the point of partial solution at least, removing the acid hydrolyzing agent, reducing the hydrolysate to dryness, treating the residue in the presence of water with a water-soluble inorganic salt of a metal selected from the following group of metals: gold, silver, mercury, lead, bismuth and antimony, and isolating the metal keratin compound formed, sufficient metal salt being added for the resulting compound to contain metal to an extent equivalent to at least 5% of silver.

2. A process for obtaining metal compounds from water-soluble keratin degradation products consisting in subjecting keratin material to a non-reducing hydrolysis by treatment with volatile acid to the point of partial solution at least, evaporating the hydrolysate to dryness in vacuo at low temperature, treating the residue in the presence of water with a water-soluble inorganic salt of a metal selected from the following group of metals: gold, silver, mercury, lead, bismuth and antimony, and isolating the metal keratin compound formed, sufficient metal salt being added for the resulting compound to contain metal to an extent equivalent to at least 5% of silver.

3. A process for obtaining metal compounds from water-soluble keratin degradation products consisting in subjecting keratin material to a non-reducing hydrolysis by treatment with acid to the point of partial solution at least, removing the acid hydrolyzing agent from the hydrolysate by precipitation, reducing the hydrolysate to dryness, treating the residue in the presence of water with a water-soluble inorganic salt of a metal selected from the following group of metals: gold, silver, mercury, lead, bismuth and antimony, and isolating the metal keratin compound formed, sufficient metal salt being added for the resulting compound to contain metal to an extent equivalent to at least 5% of silver.

4. A process for obtaining metal compounds from water-soluble keratin degradation products consisting in subjecting keratin material to a non-reducing hydrolysis by treatment with hydrochloric acid to the point of partial solution at least, evaporating the hydrolysate to dryness in vacuo at low temperature, treating the residue in the presence of water with a water-soluble inorganic salt of a metal selected from the following group of metals: gold, silver, mercury, lead, bismuth and antimony, and isolating the metal keratin compound formed, sufficient metal salt being added for the resulting compound to contain metal to an extent equivalent to at least 5% of silver.

5. A process for obtaining metal compounds from water-soluble keratin degradation products consisting in subjecting keratin material to a non-reducing hydrolysis by treatment with sulphuric acid to the point of partial solution at least, precipitating and removing the acid hydrolyzing agent by addition of a basic barium compound, evaporating the hydrolysate to dryness, treating the residue in the presence of water with a water-soluble inorganic salt of a metal selected from the following group of metals: gold, silver, mercury, lead, bismuth and antimony, and isolating the metal keratin compound formed, sufficient metal salt being added for the resulting compound to contain metal to an extent equivalent to at least 5% of silver.

6. A process for obtaining metal compounds from water-soluble keratin degradation products consisting in subjecting keratin material to a non-reducing hydrolysis by treatment with acid to the point of partial solution at least, dialyzing the mixture, removing the acid hydrolyzing agent from the hydrolysate, reducing the hydrolysate to dryness, treating the residue in the presence of water with a water-soluble inorganic salt of a metal selected from the following group of metals: gold, silver, mercury, lead, bismuth and antimony, and isolating the metal keratin compound formed, sufficient metal salt being added for the resulting compound to contain metal to an extent equivalent to at least 5% of silver.

7. A process for obtaining metal compounds from water-soluble keratin degradation products consisting in subjecting keratin material to a non-reducing hydrolysis by treatment with volatile acid to the point of partial solution at least, dialyzing the mixture, evaporating the hydrolysate to dryness, treating the residue in the presence of water with a water-soluble inorganic salt of a metal selected from the following group of metals: gold, silver, mercury, lead, bismuth and antimony, and isolating the metal keratin compound formed, sufficient metal salt being added for the resulting compound to contain metal an extent equivalent to at least 5% of silver.

8. A process for obtaining metal compounds from water-soluble keratin degradation products consisting in subjecting keratin material to a non-reducing hydrolysis by treatment with acid to the point of partial solution at least, removing the acid hydrolyzing agent from the hydrolysate by precipitation, dialyzing the mixture, reducing the hydrolysate to dryness, treating the residue in the presence of water with a water-soluble inorganic salt of a metal selected from the following group of metals: gold, silver, mercury, lead, bismuth and antimony, and isolating the metal keratin compound formed, sufficient metal salt being added for the resulting compound to contain metal to an extent equivalent to at least 5% of silver.

9. A process for obtaining metal compounds from water-soluble keratin degradation products consisting in subjecting keratin material to a non-reducing hydrolysis by treatment with sulphuric acid to the point of partial solution at least, precipitating and removing the acid hydrolyzing agent by addition of a basic barium compound, dialyzing the mixture, evaporating the hydrolysate to dryness, treating the residue in the presence of water with a water-soluble inorganic salt of a metal selected from the following group of metals: gold, silver, mercury, lead, bismuth and antimony, and isolating the metal keratin compound formed, sufficient metal salt being added for the resulting compound to contain metal to an extent equivalent to at least 5% of silver.

10. A process for obtaining metal compounds from water-soluble keratin degradation products consisting in subjecting keratin material to a non-reducing hydrolysis treatment with acid to the point of partial solution at least, removing the acid hydrolyzing agent, reducing the hydrolysate to dryness, treating the residue in the presence of water with a water-soluble inorganic salt of a metal selected from the group: gold, silver, mercury and antimony, neutralizing the mixture with alkali, precipitating the mixture with alcohol, and filtering off the precipitate of metal keratin compound, sufficient metal salt being added to the said residue for the metal content of the resulting metal keratin compound to be equivalent to at least 5% of silver.

11. A process for obtaining a gold compound from water-soluble keratin degradation products consisting in subjecting keratin material to a non-reducing hydrolysis by treatment with acid to the point of partial solution at least, removing the acid hydrolyzing agent, reducing the hydrolysate to dryness by evaporation at low temperature in vacuo, dissolving the residue in water, saturating the solution with sulphur dioxide, adding a water-soluble inorganic gold salt to the solution, neutralizing the mixture with alkali, precipitating the mixture with alcohol, and filtering off the precipitate of metal keratin compound, sufficient metal salt being added to the said residue of the metal content of the resulting metal keratin compound to be equivalent to at least 5% of silver.

12. A process for obtaining a gold compound from water-soluble keratin degradation products consisting in subjecting keratin material to a non-reducing hydrolysis by treatment with acid to the point of partial solution at least, removing the acid hydrolyzing agent, reducing the hydrolysate to dryness by evaporation at low temperature in vacuo, dissolving the residue in water, saturating the solution with sulphur dioxide, adding a water-soluble inorganic gold salt to the solution, and isolating the gold keratin compound formed, sufficient gold salt being added for the resulting compound to contain gold to an extent equivalent to at least 5% of silver.

13. A process for obtaining metal compounds from water-soluble keratin degradation products consisting in subjecting keratin material to a non-reducing hydrolysis by treatment with acid to the point of partial solution at least, removing the acid hydrolyzing agent, reducing the hydrolysate to dryness, by evaporation at low temperature in vacuo, treating the residue in the presence of water with a water-soluble inorganic salt of a metal selected from the following group of metals: gold, silver, mercury, lead, bismuth and antimony, and isolating the metal keratin compound formed, sufficient metal salt being added for the resulting compound to contain metal to an extent equivalent to at least 5% of silver.

14. A process for obtaining metal compounds from water-soluble keratin degradation products consisting in subjecting keratin material to a non-reducing hydrolysis by treatment with volatile acid to the point of partial solution at least, decolourizing the hydrolysate by means of active charcoal, evaporating the hydrolysate to dryness in vacuo at low temperature, treating the residue in the presence of water with a water-soluble inorganic salt of a metal selected from the following group of metals: gold, silver, mercury, lead, bismuth and antimony, and isolating the metal keratin compound formed, sufficient metal salt being added for the resulting compound to contain metal to an extent equivalent to at least 5% of silver.

15. A process for obtaining a gold compound from water-soluble keratin degradation products consisting in subjecting hairs to a non-reducing hydrolysis by treatment with 25% hydrochloric acid at a temperature not exceeding 100° C., dialyzing the mixture, evaporating the solution to dryness, dissolving 10 gms. of the residue in 50 cc. of water, adding to the solution a solution of 3.6 gms. of auric chloride in 18 ccm. of water little by little and with stirring, adding caustic soda until the mixture has a weakly alkaline reaction, filtering the whole and stirring the filtrate into an excess of alcohol, and filtering off the precipitated gold keratin compound.

16. A process for obtaining a gold compound from water-soluble keratin degradation products consisting in subjecting keratin material to a non-reducing hydrolysis by treatment with sulphuric acid to the point of complete dissolution, neutralizing the mixture with barium carbonate, evaporating the resulting solution to dryness, dissolving 10 gms. of the residue in 50 ccm. of water, adding to the solution little by little and whilst stirring a solution of 4 gms. of auric chloride in 20 ccm. of water, adding caustic soda until the mixture has a weakly alkaline reaction, filtering the whole and stirring the filtrate into an excess of alcohol, and filtering off the precipitated gold keratin compound.

17. A process for obtaining a gold compound from water-soluble keratin degradation products consisting in subjecting hairs to a non-reducing hydrolysis by treatment with 25% hydrochloric acid at a temperature not exceeding 100° C., dialyzing the mixture, evaporating the solution to dryness, dissolving 10 gms. of the residue in 50 cc. of water, saturating the solution with sulphur dioxide, adding little by little and whilst stirring a solution of 3.4 gms. of auric chloride in 17 ccm. of water, allowing the mixture to stand overnight, filtering the mixture and adding caustic soda until the mixture has a weakly alkaline reaction, stirring the filtrate into an excess of alcohol, and filtering off the precipitated gold keratin compound.

ERNST STURM.
RICHARD FLEISCHMANN.